United States Patent
Kim

(10) Patent No.: US 12,522,247 B2
(45) Date of Patent: Jan. 13, 2026

(54) DEVICE AND METHOD FOR NOTIFYING VEHICLE ARRIVAL TO RESPOND TO TRANSPORTATION VULNERABLE

(71) Applicant: HYUNDAI MOBIS CO., LTD., Seoul (KR)

(72) Inventor: Seung Jae Kim, Hwaseong-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 194 days.

(21) Appl. No.: 18/243,642

(22) Filed: Sep. 7, 2023

(65) Prior Publication Data

US 2024/0075960 A1 Mar. 7, 2024

(30) Foreign Application Priority Data

Sep. 7, 2022 (KR) .................. 10-2022-0113516

(51) Int. Cl.
*B60W 60/00* (2020.01)
*A61L 9/00* (2006.01)
*H04M 1/247* (2021.01)

(52) U.S. Cl.
CPC ......... *B60W 60/00253* (2020.02); *A61L 9/00* (2013.01); *A61L 2209/111* (2013.01); *B60W 2540/00* (2013.01); *B60W 2554/402* (2020.02); *B60W 2555/20* (2020.02); *H04M 1/2476* (2013.01)

(58) Field of Classification Search
CPC ..... B60W 60/00253; B60W 2554/402; B60W 2555/20; B60W 2540/00; A61L 9/00; A61L 2209/111; H04M 1/2476
See application file for complete search history.

(56) References Cited

U.S. PATENT DOCUMENTS

| | | | |
|---|---|---|---|
| 2021/0150434 A1* | 5/2021 | Keen | G06Q 10/06311 |
| 2022/0250657 A1* | 8/2022 | Kratz | B60Q 1/247 |
| 2023/0419831 A1* | 12/2023 | Kashiwakura | G08B 7/06 |

OTHER PUBLICATIONS

English Translation of KR20210069253A Title: Multi-Functional Signal Device for Blind or Hearing-Impaired Person Author: Jeong et al. Date: Jun. 11, 2021 (Year: 2021).*

* cited by examiner

*Primary Examiner* — James J Lee
*Assistant Examiner* — Steven Vu Nguyen
(74) *Attorney, Agent, or Firm* — Morgan Lewis & Bockius LLP

(57) ABSTRACT

Disclosed is a method for notifying arrival of a vehicle to respond to the transportation vulnerable including determining a vehicle notification step based on a distance between the vehicle and a person scheduled to board when the vehicle approaches a location where a call is made in response to the call of the person scheduled to board who is the transportation vulnerable, and providing a vehicle arrival notification based on the determined vehicle notification step.

18 Claims, 11 Drawing Sheets

DEVICE AND METHOD FOR NOTIFYING VEHICLE ARRIVAL TO RESPOND TO TRANSPORTATION VULNERABLE

Pursuant to 35 U.S.C. § 119(a), this application claims the benefit of Korean Patent Application No. 10-2022-0113516, filed on Sep. 7, 2022, which is hereby incorporated by reference as if fully set forth herein.

BACKGROUND

Field

The present embodiments are applicable to autonomous vehicles (vehicles) in all fields, and more specifically, for example, are applicable to a vehicle system that the transportation vulnerable, especially, visually impaired people board.

Discussion of the Related Art

Society of Automotive Engineers (SAE), an American automotive engineering society, subdivides autonomous driving levels into a total of six steps, for example, from level 0 to level 5, as follows.

Level 0 (No Automation) is a step in which a driver controls and is responsible for everything in driving. The driver always drives, and a system of an autonomous vehicle performs only auxiliary functions such as emergency notification, etc. At this level, a subject of driving control is human and variable detection and driving responsibility during driving are held by the human.

Level 1 (Driver Assistance) is a step of assisting a driver through adaptive cruise control and lane keeping functions. By activating a system, a driver is assisted by maintaining a speed of an autonomous vehicle, a vehicle-to-vehicle distance, and lanes. At this level, driving control subjects are a human and a system, and both the detection of variables that occur during driving and the driving responsibility are held by the humans.

Level 2 (Partial Automation) is a step in which an autonomous vehicle and a human can control steering and acceleration/deceleration of the autonomous vehicle for a certain period of time within a specific condition. Auxiliary functions such as steering at a gentle curve and maintaining a distance from a car in front are available. However, at this level, the detection of variables during driving and the driving responsibility are held by the human, the driver should always monitor a driving situation, and the driver should intervene immediately in a situation where the system is not aware of it.

Level 3 (Conditional Automation) is the level at which a system is in charge of driving in certain sections of conditions, such as highways, and at which a driver intervenes only in case of danger. The system is in charge of driving control and variable detection during driving, and unlike Level 2, the monitoring is not required. However, if it exceeds the requirements of the system, the system requests the immediate intervention of the driver.

Level 4 (High Automation) is capable of autonomous driving on most roads. Both driving control and driving responsibility are held by a system. Driver intervention is unnecessary on most roads except for restricted situations. However, since driver intervention may be requested under certain conditions such as bad weather, a driving control device through humans is necessary for this level.

Level 5 (Full Automation) is a step of enabling a driving by an occupant only without a driver. The occupant enters only a destination and a system is responsible for driving under all conditions. At Level 5, control devices for steering, acceleration, and deceleration of an autonomous vehicle are unnecessary.

However, when the transportation vulnerable, especially visually impaired people, call and then board public transportation (a taxi), there are difficulties in identifying a called vehicle, an arrival direction, and a location of a door, so that there is a need for a vehicle arrival notifying device to respond to the transportation vulnerable.

SUMMARY

To solve the problem described above, one embodiment of the present disclosure is to provide a vehicle arrival notifying device to respond to the transportation vulnerable in which a vehicle provides information by utilizing visual/auditory/tactile feedback such that visually impaired people may identify a called taxi.

The problems to be solved in the present disclosure are not limited to the technical problems mentioned above, and other technical problems not mentioned will be clearly understood by those skilled in the art to which the present disclosure belongs from the description below.

One aspect of the present disclosure provides a method for notifying arrival of a vehicle to respond to the transportation vulnerable including determining a vehicle notification step based on a distance between the vehicle and a person scheduled to board when the vehicle approaches a location where a call is made in response to the call of the person scheduled to board who is the transportation vulnerable, and providing a vehicle arrival notification based on the determined vehicle notification step.

In one implementation of the present disclosure, the method may further include receiving, by the vehicle, the vehicle call via a smartphone of the person scheduled to board, selecting an arrival location of the vehicle in response to the vehicle call, and selecting fragrance to be discharged to the person scheduled to board via the smartphone.

In one implementation of the present disclosure, the determining of the vehicle notification step based on the distance between the vehicle and the person scheduled to board may include setting an area of the distance to be a vehicle notification step 1 area when the distance between the vehicle and the person scheduled to board is equal to or smaller than a first distance, setting an area of the distance to be a vehicle notification step 2 area when the distance between the vehicle and the person scheduled to board is equal to or smaller than a second distance, and setting an area of the distance to be a vehicle notification step 3 area when the distance between the vehicle and the person scheduled to board is equal to or smaller than a third distance.

In one implementation of the present disclosure, the first distance may be set for a case where the distance between the vehicle and the person scheduled to board is in a range from 7 to 10 m, the second distance may be set for a case where the distance between the vehicle and the person scheduled to board is in a range from 3 to 7 m, and the third distance may be set for a case where the distance between the vehicle and the person scheduled to board is in a range from 0 to 3 m.

In one implementation of the present disclosure, the providing of the vehicle arrival notification based on the determined vehicle notification step may include outputting a message, as the notification, indicating that the called vehicle is coming to the person scheduled to board via a notification using a smartphone in the case of the vehicle notification step 1 area.

In one implementation of the present disclosure, the providing of the vehicle arrival notification based on the determined vehicle notification step may include outputting a notification indicating that the vehicle is about to arrive using an external speaker installed on the vehicle via a notification using auditory feedback when the person scheduled to board comes near the vehicle in the case of the vehicle notification step 2 area.

In one implementation of the present disclosure, the providing of the vehicle arrival notification based on the determined vehicle notification step may include determining an ambient noise level based on location information, navigation information, and object detection information, and outputting the vehicle arrival notification with a volume 1.5 times higher than a default sound volume when the ambient noise level is high.

In one implementation of the present disclosure, the providing of the vehicle arrival notification based on the determined vehicle notification step may include outputting a notification using olfactory and tactile feedback for notifying the arrival and a direction of the vehicle using fragrance and wind in the case of the vehicle notification step 3 area.

In one implementation of the present disclosure, the providing of the vehicle arrival notification based on the determined vehicle notification step may include identifying weather based on weather information of a current location and object detection information, and discharging the wind with a strength 1.5 times greater than a default wind strength and discharging the fragrance with a concentration 1.5 times greater than a default fragrance concentration and for a duration 2 times greater than an existing fragrance discharge duration when the identified weather is rainy weather.

According to one of the embodiments of the present disclosure, the information that the vehicle may provide to the visually impaired people may be provided differently for each distance area, so that the visually impaired people may more easily identify the called vehicle.

According to one of the embodiments of the present disclosure, when the vehicle comes near the visually impaired people, the visually impaired people may identify in which direction the vehicle has arrived when the vehicle sends the fragrance on the wind in the direction of the visually impaired people, thereby determining the location of the door to board.

The effects obtainable from the present disclosure are not limited to the effects mentioned above, and other effects not mentioned will be clearly understood by those skilled in the art from the description below.

DESCRIPTION OF SPECIFIC EMBODIMENTS

Hereinafter, embodiments of the present disclosure will be described in detail with reference to the accompanying drawings so that those skilled in the art to which the present disclosure pertains may easily implement the present disclosure. However, the present disclosure may be implemented in various different forms and is not limited to the embodiments described herein. In addition, in order to clearly describe this disclosure in drawings, parts unrelated to the description are omitted and similar reference numbers are given to similar parts throughout the specification.

Throughout the specification, when a part "includes" a certain component, this means that it may further include other components, rather than excluding other components, unless otherwise stated.

Figure 1:
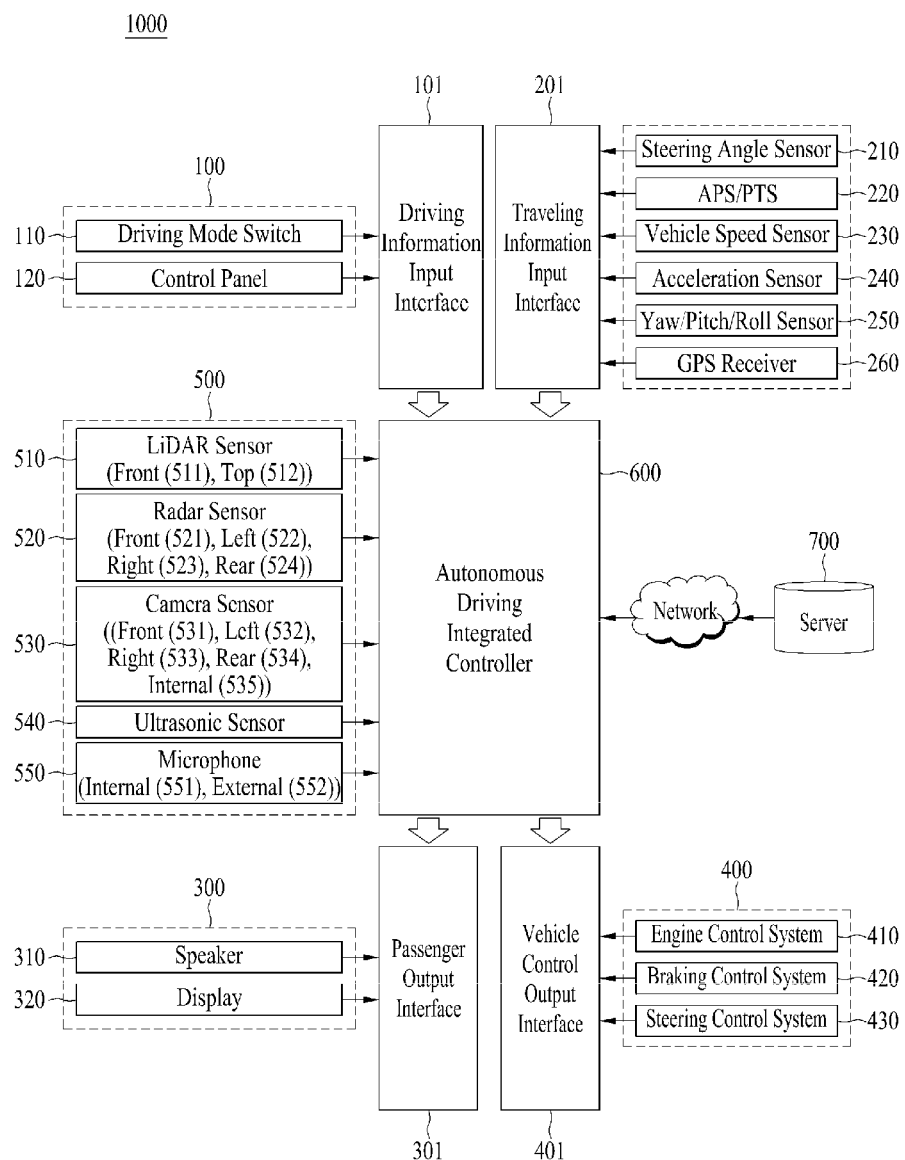
FIG. 1 is an overall block diagram of an autonomous driving control system to which an autonomous driving apparatus according to any one of embodiments of the present disclosure is applicable.
Figure 2:
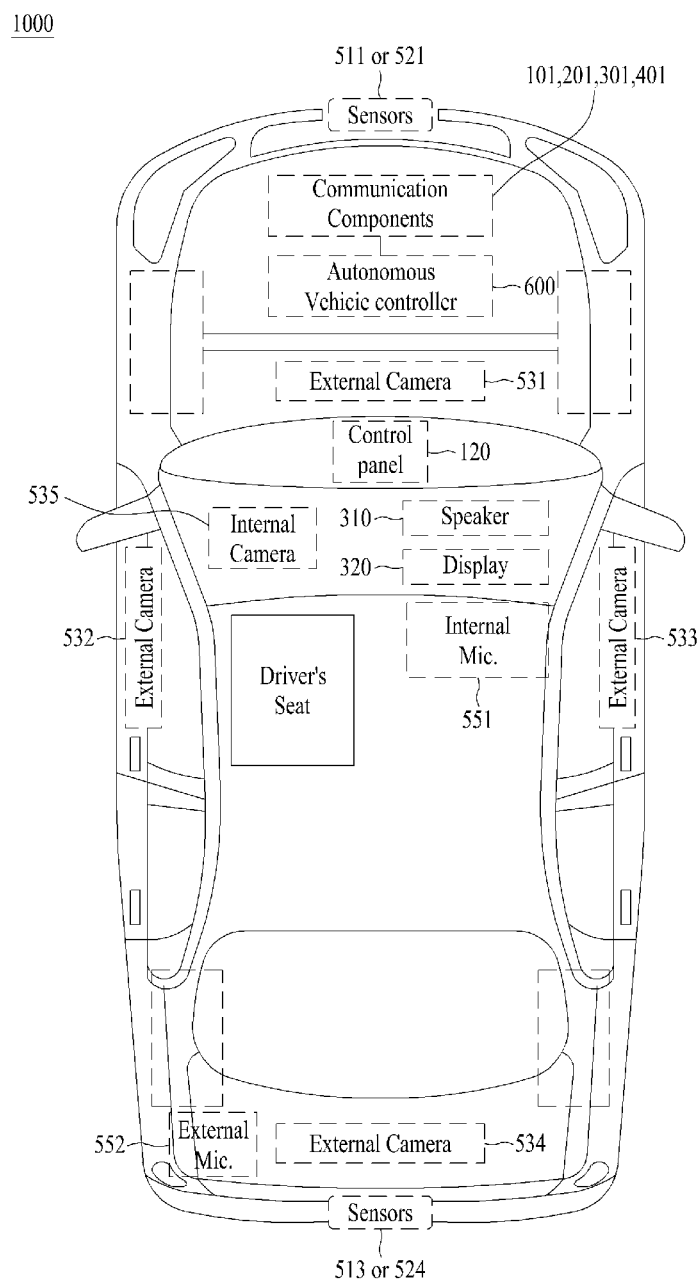
FIG. 2 is a diagram illustrating an example in which an autonomous driving apparatus according to any one of embodiments of the present disclosure is applied to a vehicle.

FIG. 1 is an overall block diagram of an autonomous driving control system to which an autonomous driving apparatus according to any one of embodiments of the present disclosure is applicable. FIG. 2 is a diagram illustrating an example in which an autonomous driving apparatus according to any one of embodiments of the present disclosure is applied to a vehicle.

First, a structure and function of an autonomous driving control system (e.g., an autonomous driving vehicle) to which an autonomous driving apparatus according to the present embodiments is applicable will be described with reference to FIGS. 1 and 2.

As illustrated in FIG. 1, an autonomous driving vehicle 1000 may be implemented based on an autonomous driving integrated controller 600 that transmits and receives data necessary for autonomous driving control of a vehicle through a driving information input interface 101, a traveling information input interface 201, an occupant output interface 301, and a vehicle control output interface 401.

However, the autonomous driving integrated controller 600 may also be referred to herein as a controller, a processor, or, simply, a controller.

The autonomous driving integrated controller 600 may obtain, through the driving information input interface 101, driving information based on manipulation of an occupant for a user input unit 100 in an autonomous driving mode or manual driving mode of a vehicle. As illustrated in FIG. 1, the user input unit 100 may include a driving mode switch 110 and a control panel 120 (e.g., a navigation terminal mounted on the vehicle or a smartphone or tablet computer owned by the occupant). Accordingly, driving information may include driving mode information and navigation information of a vehicle.

For example, a driving mode (i.e., an autonomous driving mode/manual driving mode or a sports mode/eco mode/safety mode/normal mode) of the vehicle determined by manipulation of the occupant for the driving mode switch 110 may be transmitted to the autonomous driving integrated controller 600 through the driving information input interface 101 as the driving information.

Furthermore, navigation information, such as the destination of the occupant input through the control panel 120 and a path up to the destination (e.g., the shortest path or preference path, selected by the occupant, among candidate paths up to the destination), may be transmitted to the autonomous driving integrated controller 600 through the driving information input interface 101 as the driving information.

The control panel 120 may be implemented as a touch-screen panel that provides a user interface (UI) through which the occupant inputs or modifies information for autonomous driving control of the vehicle. In this case, the driving mode switch 110 may be implemented as touch buttons on the control panel 120.

In addition, the autonomous driving integrated controller 600 may obtain traveling information indicative of a driving state of the vehicle through the traveling information input interface 201. The traveling information may include a steering angle formed when the occupant manipulates a steering wheel, an accelerator pedal stroke or brake pedal stroke formed when the occupant depresses an accelerator pedal or brake pedal, and various types of information indicative of driving states and behaviors of the vehicle, such as a vehicle speed, acceleration, a yaw, a pitch, and a roll formed in the vehicle. The traveling information may be detected by a traveling information detection unit 200, including a steering angle sensor 210, an accelerator position sensor (APS)/pedal travel sensor (PTS) 220, a vehicle speed sensor 230, an acceleration sensor 240, and a yaw/pitch/roll sensor 250, as illustrated in FIG. 1.

Furthermore, the traveling information of the vehicle may include location information of the vehicle. The location information of the vehicle may be obtained through a global positioning system (GPS) receiver 260 applied to the vehicle. Such traveling information may be transmitted to the autonomous driving integrated controller 600 through the traveling information input interface 201 and may be used to control the driving of the vehicle in the autonomous driving mode or manual driving mode of the vehicle.

The autonomous driving integrated controller 600 may transmit driving state information provided to the occupant to an output unit 300 through the occupant output interface 301 in the autonomous driving mode or manual driving mode of the vehicle. That is, the autonomous driving integrated controller 600 transmits the driving state information of the vehicle to the output unit 300 so that the occupant may check the autonomous driving state or manual driving state of the vehicle based on the driving state information output through the output unit 300. The driving state information may include various types of information indicative of driving states of the vehicle, such as a current driving mode, transmission range, and speed of the vehicle.

If it is determined that it is necessary to warn a driver in the autonomous driving mode or manual driving mode of the vehicle along with the above driving state information, the autonomous driving integrated controller 600 transmits warning information to the output unit 300 through the occupant output interface 301 so that the output unit 300 may output a warning to the driver. In order to output such driving state information and warning information acoustically and visually, the output unit 300 may include a speaker 310 and a display 320 as illustrated in FIG. 1. In this case, the display 320 may be implemented as the same device as the control panel 120 or may be implemented as an independent device separated from the control panel 120.

Furthermore, the autonomous driving integrated controller 600 may transmit control information for driving control of the vehicle to a lower control system 400, applied to the vehicle, through the vehicle control output interface 401 in the autonomous driving mode or manual driving mode of the vehicle. As illustrated in FIG. 1, the lower control system 400 for driving control of the vehicle may include an engine control system 410, a braking control system 420, and a steering control system 430. The autonomous driving integrated controller 600 may transmit engine control information, braking control information, and steering control information, as the control information, to the respective lower control systems 410, 420, and 430 through the vehicle control output interface 401. Accordingly, the engine control system 410 may control the speed and acceleration of the vehicle by increasing or decreasing fuel supplied to an engine. The braking control system 420 may control the braking of the vehicle by controlling braking power of the vehicle. The steering control system 430 may control the steering of the vehicle through a steering device (e.g., motor driven power steering (MDPS) system) applied to the vehicle.

As described above, the autonomous driving integrated controller 600 according to the present embodiment may obtain the driving information based on manipulation of the driver and the traveling information indicative of the driving state of the vehicle through the driving information input interface 101 and the traveling information input interface 201, respectively, and transmit the driving state information and the warning information, generated based on an autonomous driving algorithm, to the output unit 300 through the occupant output interface 301. In addition, the autonomous driving integrated controller 600 may transmit the control information generated based on the autonomous driving algorithm to the lower control system 400 through the vehicle control output interface 401 so that driving control of the vehicle is performed.

In order to guarantee stable autonomous driving of the vehicle, it is necessary to continuously monitor the driving state of the vehicle by accurately measuring a driving environment of the vehicle and to control driving based on the measured driving environment. To this end, as illustrated in FIG. 1, the autonomous driving apparatus according to the present embodiment may include a sensor unit 500 for detecting a nearby object of the vehicle, such as a nearby vehicle, pedestrian, road, or fixed facility (e.g., a signal light, a signpost, a traffic sign, or a construction fence).

The sensor unit 500 may include one or more of a LiDAR sensor 510, a radar sensor 520, or a camera sensor 530, in order to detect a nearby object outside the vehicle, as illustrated in FIG. 1.

The LiDAR sensor 510 may transmit a laser signal to the periphery of the vehicle and detect a nearby object outside the vehicle by receiving a signal reflected and returning from a corresponding object. The LiDAR sensor 510 may detect a nearby object located within the ranges of a preset distance, a preset vertical field of view, and a preset horizontal field of view, which are predefined depending on specifications thereof. The LiDAR sensor 510 may include a front LiDAR sensor 511, a top LiDAR sensor 512, and a rear LiDAR sensor 513 installed at the front, top, and rear of the vehicle, respectively, but the installation location of each LiDAR sensor and the number of LiDAR sensors installed are not limited to a specific embodiment. A threshold for determining the validity of a laser signal reflected and returning from a corresponding object may be previously stored in a memory (not illustrated) of the autonomous driving integrated controller 600. The autonomous driving integrated controller 600 may determine a location (including a distance to a corresponding object), speed, and moving direction of the corresponding object using a method of measuring time taken for a laser signal, transmitted through the LiDAR sensor 510, to be reflected and returning from the corresponding object.

The radar sensor 520 may radiate electromagnetic waves around the vehicle and detect a nearby object outside the vehicle by receiving a signal reflected and returning from a corresponding object. The radar sensor 520 may detect a nearby object within the ranges of a preset distance, a preset vertical field of view, and a preset horizontal field of view, which are predefined depending on specifications thereof. The radar sensor 520 may include a front radar sensor 521, a left radar sensor 522, a right radar sensor 523, and a rear radar sensor 524 installed at the front, left, right, and rear of the vehicle, respectively, but the installation location of each radar sensor and the number of radar sensors installed are not limited to a specific embodiment. The autonomous driving integrated controller 600 may determine a location (including a distance to a corresponding object), speed, and moving direction of the corresponding object using a method of analyzing power of electromagnetic waves transmitted and received through the radar sensor 520.

The camera sensor 530 may detect a nearby object outside the vehicle by photographing the periphery of the vehicle and detect a nearby object within the ranges of a preset distance, a preset vertical field of view, and a preset horizontal field of view, which are predefined depending on specifications thereof.

The camera sensor 530 may include a front camera sensor 531, a left camera sensor 532, a right camera sensor 533, and a rear camera sensor 534 installed at the front, left, right, and rear of the vehicle, respectively, but the installation location of each camera sensor and the number of camera sensors installed are not limited to a specific embodiment. The autonomous driving integrated controller 600 may determine a location (including a distance to a corresponding object), speed, and moving direction of the corresponding object by applying predefined image processing to an image captured by the camera sensor 530.

In addition, an internal camera sensor 535 for capturing the inside of the vehicle may be mounted at a predetermined location (e.g., rear view mirror) within the vehicle. The autonomous driving integrated controller 600 may monitor a behavior and state of the occupant based on an image captured by the internal camera sensor 535 and output guidance or a warning to the occupant through the output unit 300.

As illustrated in FIG. 1, the sensor unit 500 may further include an ultrasonic sensor 540 in addition to the LiDAR sensor 510, the radar sensor 520, and the camera sensor 530 and further adopt various types of sensors for detecting a nearby object of the vehicle along with the sensors.

FIG. 2 illustrates an example in which, in order to aid in understanding the present embodiment, the front LiDAR sensor 511 or the front radar sensor 521 is installed at the front of the vehicle, the rear LiDAR sensor 513 or the rear radar sensor 524 is installed at the rear of the vehicle, and the front camera sensor 531, the left camera sensor 532, the right camera sensor 533, and the rear camera sensor 534 are installed at the front, left, right, and rear of the vehicle, respectively. However, as described above, the installation location of each sensor and the number of sensors installed are not limited to a specific embodiment.

Furthermore, in order to determine a state of the occupant within the vehicle, the sensor unit 500 may further include a bio sensor for detecting bio signals (e.g., heart rate, electrocardiogram, respiration, blood pressure, body temperature, electroencephalogram, photoplethysmography (or pulse wave), and blood sugar) of the occupant. The bio sensor may include a heart rate sensor, an electrocardiogram sensor, a respiration sensor, a blood pressure sensor, a body temperature sensor, an electroencephalogram sensor, a photoplethysmography sensor, and a blood sugar sensor.

Finally, the sensor unit 500 additionally includes a microphone 550 having an internal microphone 551 and an external microphone 552 used for different purposes.

The internal microphone 551 may be used, for example, to analyze the voice of the occupant in the autonomous driving vehicle 1000 based on AI or to immediately respond to a direct voice command of the occupant.

In contrast, the external microphone 552 may be used, for example, to appropriately respond to safe driving by analyzing various sounds generated from the outside of the autonomous driving vehicle 1000 using various analysis tools such as deep learning.

For reference, the symbols illustrated in FIG. 2 may perform the same or similar functions as those illustrated in FIG. 1. FIG. 2 illustrates in more detail a relative positional relationship of each component (based on the interior of the autonomous driving vehicle 1000) as compared with FIG. 1.

Figure 3:
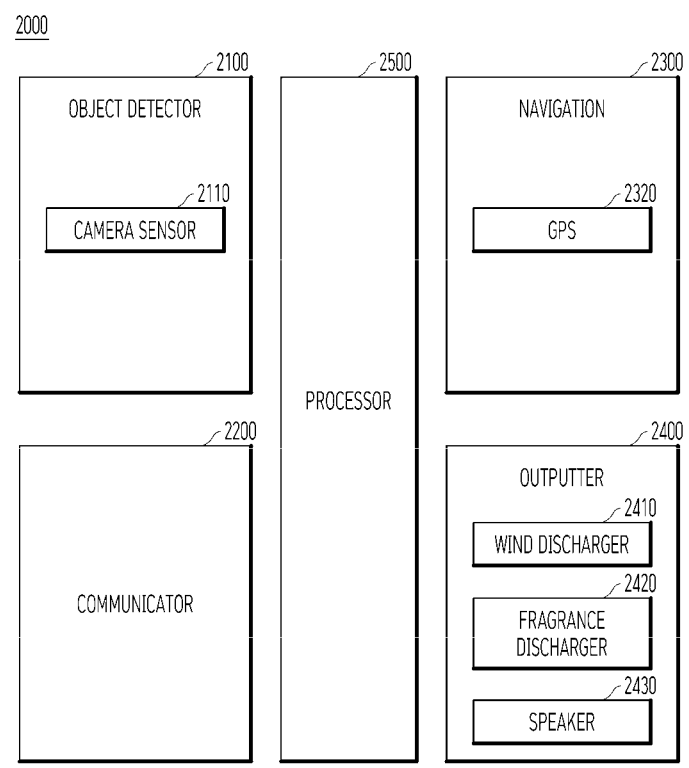
FIGS. 3 to 4 are diagrams for illustrating a vehicle arrival notifying device to respond to the transportation vulnerability according to one of embodiments of the present disclosure.
Figure 4:
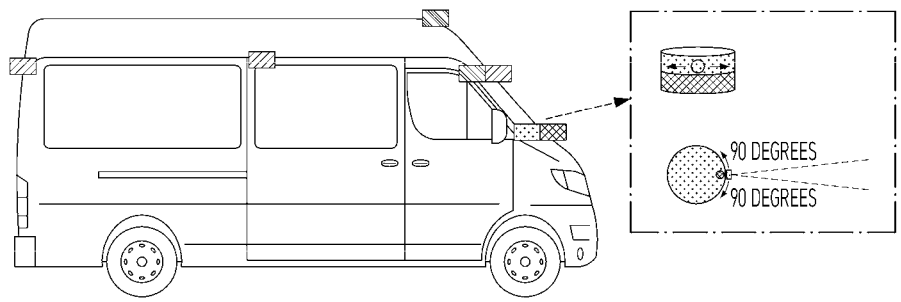

FIGS. 3 to 4 are diagrams for illustrating a vehicle arrival notifying device to respond to the transportation vulnerability according to one of embodiments of the present disclosure.

Referring to FIGS. 3 and 4, a vehicle arrival notifying device 2000 to respond to the transportation vulnerable may include an object detector 2100, a communicator 2200, a navigation 2300, an outputter 2400, and a processor 2500.

The object detector 2100 is for recognizing an object around the vehicle 1000 and is able to include at least one of a camera sensor 2110, a radar sensor, and a lidar sensor. The object detector 2100 may sense a person scheduled to board located around the vehicle.

The camera sensor 2110 may capture an image of surroundings of the vehicle 1000 to detect the surrounding object outside the vehicle 1000 or may detect the surrounding object located within ranges of a set distance, a set vertical field of view, and a set horizontal field of view predefined based on a specification thereof.

The camera sensor 2110 may include a front camera sensor, a left camera sensor, a right camera sensor, and a rear camera sensor installed on a front surface, a left side surface, a right side surface, and a rear surface of the vehicle 1000, respectively, but installation locations and the number of installed camera sensors are not limited by a particular embodiment. The processor 2500 of the vehicle 1000 may determine a location (including a distance to the corresponding object), a speed, a moving direction, and the like of the corresponding object by applying predefined image processing to the image captured via the camera sensor.

A radar sensor 2120 may detect the surrounding object outside the vehicle 1000 by radiating an electromagnetic wave to a location near the vehicle 1000 and receiving a signal reflected back by the corresponding object, or may detect the surrounding object located within ranges of a set distance, a set vertical field of view, and a set horizontal field of view predefined based on a specification thereof. The radar sensor 2120 may include a front radar sensor, a left radar sensor, a right radar sensor, and a rear radar sensor installed on the front surface, the left side surface, the right side surface, and the rear surface of the vehicle 1000, respectively, but installation locations and the number of installed radar sensors are not limited by a particular embodiment. The processor 2500 of the vehicle 1000 may determine the location (including the distance to the corresponding object), the speed, and the direction of movement of the corresponding object in a scheme of analyzing power of the electromagnetic wave transmitted and received via the radar sensor 2120.

A lidar sensor 2130 may detect the surrounding object outside the vehicle 1000 by transmitting a laser signal to the location near the vehicle 1000 and receiving a signal reflected back by the corresponding object, or may detect the surrounding object located within ranges of a set distance, a set vertical field of view, and a set horizontal field of view predefined based on a specification thereof. The lidar sensor 2130 may include a front lidar sensor 2130, a top lidar sensor 2130, and a rear lidar sensor 2130 installed on the front surface, a top surface, and the rear surface of the vehicle 1000, respectively, but installation locations and the number of installed lidar sensors are not limited by a particular embodiment. A threshold value for determining validity of the laser signal reflected back by the corresponding object may be stored in advance in a memory (not shown) of the processor 2500 of the vehicle 1000, and the processor 2500 of the vehicle 1000 may determine the location (including the distance to the corresponding object), the speed, and the moving direction of the corresponding object in a scheme of measuring a time for the laser signal transmitted via the lidar sensor 2130 to be reflected back by the corresponding object.

In addition to the camera sensor 2110, the radar sensor 2120, and the lidar sensor 2130, the object detector 2100 may further include an ultrasonic sensor, and various types of sensors for detecting the object around the vehicle 1000 may be further employed for the object detector 2100.

The object detector 2100 may perform target object classification (a vehicle, a pedestrian, a bicycle, and a motorcycle) via the camera sensor 2100 and detect target object information (a relative distance, a relative speed, and an object size).

The communicator 2200 may include one or more transceivers, and may receive user data, control information, a wireless signal/channel, and the like referred to in functions, procedures, proposals, methods, and/or operational flowcharts disclosed herein from one or more other devices via the one or more transceivers. For example, the one or more transceivers may be connected to the processor 2500 and may transmit and/or receive the wireless signal. For example, at least one processor in the processor 2500 may control the one or more transceivers to transmit the user data, the control information, or the wireless signal to the one or more other devices. In addition, the processor 2500 may control the one or more transceivers to receive the user data, the control information, or the wireless signal from the one or more other devices. In addition, the one or more transceivers may be connected to one or more antennas, and the one or more transceivers may be set to transmit and/or receive the user data, the control information, the wireless signal/channel, and the like to and/or from other device(s) via the one or more antennas.

The navigation 2300 may provide navigation information. The navigation information may include at least one of set destination information, route information based on the destination, map information related to a travel route, and current location information of the vehicle 1000. The navigation 2300 may provide information such as curvature information of a road, the number of lanes on the road, a size of the lane on the road, a predicted route, and the like to the processor 2500 as map information related to the travel route. The navigation 2300 may include a global positioning system (GPS) 2310, and may acquire GPS coordinates of the vehicle 1000 via the GPS 2310.

The outputter 2400 may include a wind discharger 2410, a fragrance discharger 2420, and a speaker 2430.

The outputter 2400 may provide wind and fragrance to the person scheduled to board via the wind discharger 2410 and the fragrance discharger 2420, respectively. In this regard, the wind discharger 2410 and the fragrance discharger 2420 may be located close to each other such that the fragrance has a directionality.

In this regard, the outputter 2400 may provide the fragrance like a spray via the fragrance discharger 2420 and continuously emit the wind using the wind discharger 2410 to provide the fragrance to the person scheduled to board who is away from the vehicle by a certain distance or more.

For example, the wind discharger 2410 and the fragrance discharger 2420 are internally connected to each other, and the wind discharger 2410 sends the wind toward the person scheduled to board after the fragrance is supplied.

For example, the wind discharger 2410 may rotate 180 degrees to send the fragrance and the wind toward the person scheduled to board located in front of the vehicle.

When receiving a vehicle call via a smartphone of the person scheduled to board, the processor 2500 may select an arrival location of the vehicle in response to the vehicle call and select the fragrance to be discharged in response to the smartphone.

When the vehicle arrives at a location where the call is made, the processor 2500 may determine a vehicle notification step based on the distance between the vehicle and the person scheduled to board.

When the distance between the vehicle and the person scheduled to board is equal to or smaller than a first distance, the processor 2500 may set a corresponding distance area to be a vehicle notification step 1 area. For example, the first distance corresponds to a case in which the distance between the vehicle and the person scheduled to board is in a range from 0 to 3 m.

When the distance between the vehicle and the person scheduled to board is equal to or smaller than a second distance, the processor 2500 may set a corresponding distance area to be a vehicle notification step 2 area. For example, the second distance corresponds to a case in which the distance between the vehicle and the person scheduled to board is in a range from 3 to 7 m.

When the distance between the vehicle and the person scheduled to board is equal to or smaller than a third distance, the processor 2500 may set a corresponding distance area to be a vehicle notification step 3 area. For example, the third distance corresponds to a case in which the distance between the vehicle and the person scheduled to board is in a range from 7 to 10 m.

The processor 2500 may provide a vehicle arrival notification based on the determined vehicle notification step.

In the case of the vehicle notification step 1 area, the processor 2500 may control a message indicating that the called vehicle is coming to be output as a notification to the person scheduled to board via a notification using the smart phone.

In the case of the vehicle notification step 2 area, when the person scheduled to board comes near the vehicle, the processor 2500 may control a notification indicating that the vehicle is about to arrive to be output via a notification using auditory feedback, using an external speaker installed on the vehicle.

In the case of the vehicle notification step 3 area, the processor 2500 may control a notification using olfactory and tactile feedback to output vehicle arrival and direction using the fragrance and the wind.

In one example, the processor 2500 may provide a sound volume differential based on an ambient noise level in the vehicle arrival notification.

For example, the processor 2500 may determine the ambient noise level via location information, navigation information, and object detection information. The processor 2500 may output the vehicle arrival notification with a volume 1.5 times higher than a default sound volume when the ambient noise level is high. The processor 2500 may control the default sound volume to be maintained when the ambient noise level is not high.

For example, the processor 2500 may control, based on the ambient noise level, the volume to be maintained at the same level as an existing sound volume within the vehicle notification step 1 area, which is a smartphone notification area, and the vehicle notification step 3 area, which is a tactile/olfactory notification area. The processor 2500 may control the sound volume to be increased by 1.5 to 2 times the existing sound volume within the vehicle notification step 2 area, which is an auditory notification area.

In addition, the processor 2500 may provide fragrance concentration and wind strength differentials based on weather information in the vehicle arrival notification.

To this end, the processor 2500 may determine weather via weather information of a current location and external camera information.

For example, the processor 2500 may determine whether the determined weather is rainy weather. The processor 2500 may provide the fragrance concentration and wind strength differentials in response to the rainy weather. In the case of the rainy weather, the processor 2500 may output the wind with a strength 1.5 times greater than a default wind strength, and discharge the fragrance with a concentration 1.5 times greater than a default fragrance concentration and for a duration 2 times greater than an existing fragrance discharge duration. The processor 2500 may control the default fragrance concentration and wind strength to be maintained when not in the rainy weather.

For example, the processor 2500 may control the fragrance to be discharged with a concentration 1.5 times greater than an existing concentration and for a duration 2 times greater than the existing fragrance discharge duration within the vehicle notification step 3 area, which is the tactile/olfactory notification area, based on the weather information. In addition, the processor 2500 may control the wind to be discharged with the strength 2 times greater than an existing strength.

Figure 5:
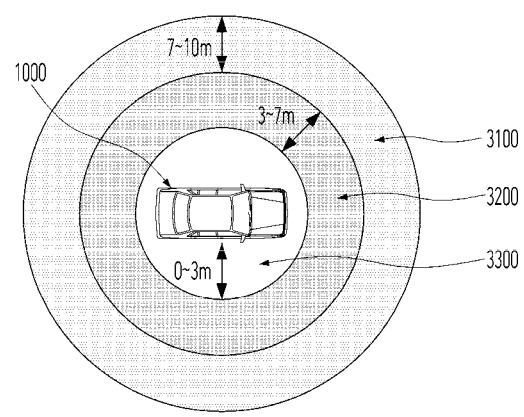
FIG. 5 is a diagram for illustrating a vehicle notification area to respond to the transportation vulnerable according to embodiments of the present disclosure.

FIG. 5 is a diagram for illustrating a vehicle notification area to respond to the transportation vulnerable according to embodiments of the present disclosure.

Referring to FIG. 5, the vehicle arrival notifying device 2000 to respond to the transportation vulnerable may set the vehicle notification area based on the distance between the vehicle 1000 and the person scheduled to board. Information may be provided by dividing the area of the distance between vehicle 1000 and the person scheduled to board into three.

In this regard, the transportation vulnerable may be people who experience inconvenience when using transportation or walking on the road. For example, the transportation vulnerable may include the physically handicapped, pregnant women, infants, children and adolescents, and the elderly. The physically handicapped may include the visually impaired people, hearing impaired people, and the like. In addition, the transportation vulnerable may further include buggy pushers, wheelchair users, and the like, but may not be limited thereto.

The vehicle notification area may be set to be a vehicle notification step 1 area 3100 when the distance between the vehicle 1000 and the person scheduled to board is equal to or smaller than the first distance. According to an embodiment, the vehicle notification step 1 area 3100 may be an area with the distance between the vehicle 1000 and the person scheduled to board in a range from 7 to 10 m.

The vehicle notification step 1 area 3100 may be set to be the notification area using the notification using the smartphone. Via communication between the vehicle 1000 and the smartphone, the notification using the smartphone may provide a notification to the vehicle 1000 to go slowly because there is a passenger in a vicinity of about 10 meters, and output a notification to the person scheduled to board via the smartphone as a message indicating that the called vehicle 1000 is coming soon.

The vehicle notification area may be set to be a vehicle notification step 2 area 3200 when the distance between the vehicle 1000 and the person scheduled to board is equal to or smaller than the second distance. According to an embodiment, the vehicle notification step 2 area 3200 may be an area with the distance between the vehicle 1000 and the person scheduled to board in a range from 3 to 7 m.

The vehicle notification step 2 area 3200 may be set to be the notification area using the auditory feedback. The notification using the auditory feedback may output a notification that the vehicle 1000 is about to arrive using the external speaker installed on the vehicle 1000 when the person scheduled to board is near the vehicle.

The vehicle notification area may be set to be a vehicle notification step 3 area 3300 when the distance between the vehicle 1000 and the person scheduled to board is equal to or smaller than the third distance. According to an embodiment, the vehicle notification step 3 area 3300 may be an area with the distance between the vehicle 1000 and the person scheduled to board in a range from 0 to 3 m.

The vehicle notification step 3 area 3300 may be set to be the notification area using the tactile and olfactory feedback. The notification using the tactile and olfactory feedback may output a notification such that the person scheduled to board knows a direction and a location of arrival by carrying the fragrance on the wind toward the person scheduled to board using the wind and the fragrance.

Because the visually impaired people among the people scheduled to board are more sensitive than other people in other senses except for vision, the notification may be provided thereto to feel the concentration of the fragrance and the direction of the wind with faces. The person scheduled to board may identify that the vehicle 1000 is coming closer as the fragrance output from the vehicle 1000 becomes stronger, and also recognize the direction of the approaching vehicle 1000 via the direction of the wind and the fragrance, so that the notification may be output for the person scheduled to board to identify front surface/rear surface of the vehicle 1000. By giving a process of specifying a specific fragrance when calling the vehicle, the corresponding fragrance may be provided upon the vehicle arrival.

Figure 6:
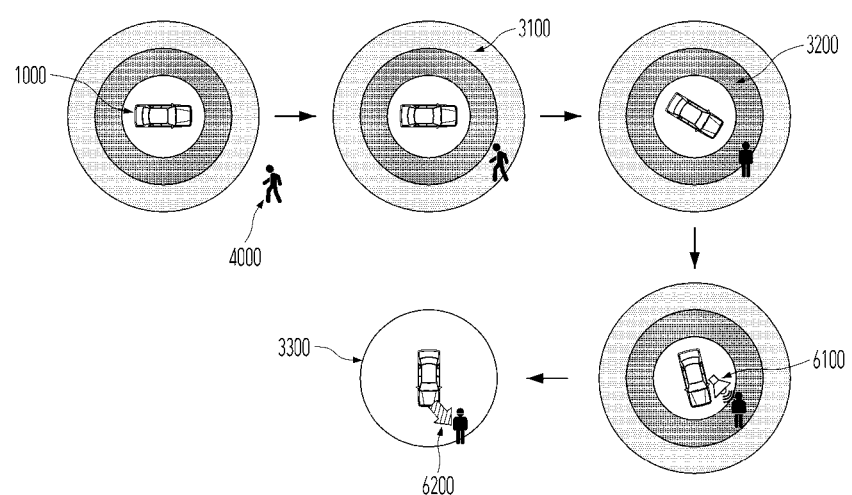
FIG. 6 is a diagram for illustrating an operation of a vehicle to respond to the transportation vulnerable according to embodiments of the present disclosure.

FIG. 6 is a diagram for illustrating an operation of a vehicle to respond to the transportation vulnerable according to embodiments of the present disclosure.

Referring to FIG. 6, a vehicle may move near a destination to board in response to a call, and a person scheduled to board and the vehicle may respectively move to become closer to each other.

When the distance between the vehicle 1000 and the person scheduled to board 4000 is reduced to be within the vehicle notification step 1 area 3100, the vehicle 1000 may provide the notification using the smartphone to the person scheduled to board 4000. In this regard, the notification using the smartphone may be a vibration or a guide message instructing the person scheduled to board 4000 to stand at a corresponding location. Thereafter, the vehicle 1000 may receive information on the person scheduled to board and approach the person scheduled to board 4000 using the camera sensor or the like.

When the vehicle 1000 moves and approaches the vehicle notification step 2 area 3200, the vehicle 1000 may provide a notification 6100 using the auditory feedback to the person scheduled to board 4000. In this regard, the notification 6100 using the auditory feedback may be a notification indicating that the vehicle 1000 will arrive soon, which is output using the external speaker of the vehicle 1000.

Thereafter, when the vehicle 1000 approaches the vehicle notification step 3 area 3300, a notification 6200 using the olfactory and tactile feedback may be provided. The notification 6200 using the olfactory and tactile feedback may provide the vehicle arrival and direction to the person scheduled to board 4000 using the wind and the fragrance.

Figure 7:
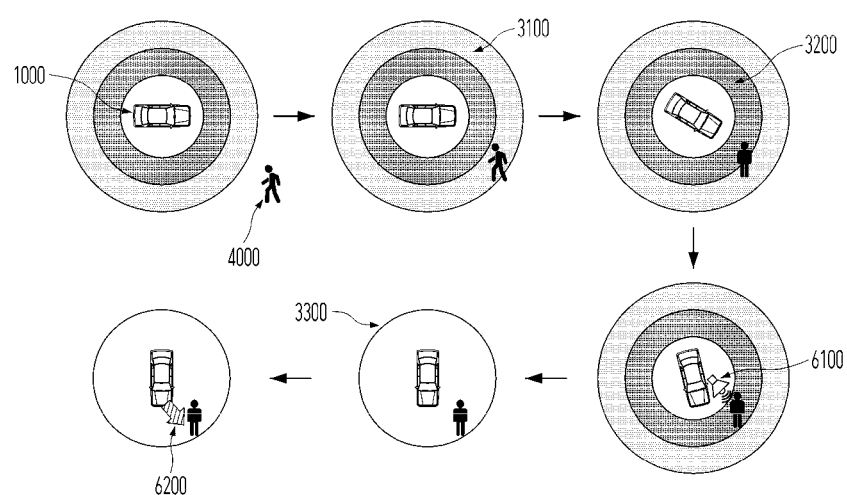
FIG. 7 is a diagram for illustrating an entry operation of a person scheduled to board who will board a vehicle to respond to the transportation vulnerable according to embodiments of the present disclosure.

FIG. 7 is a diagram for illustrating an entry operation of a person scheduled to board who will board a vehicle to respond to the transportation vulnerable according to embodiments of the present disclosure.

Referring to FIG. 7, the person scheduled to board 4000 may carry the smartphone and move near the destination to board without any feedback.

When receiving the notification using the smartphone, the person scheduled to board 4000 may receive a guide to stop at the corresponding location. In this regard, the notification using the smartphone may be the vibration. Accordingly, the person scheduled to board 4000 may determine that vehicle 1000 has approached within 10 meters.

The person scheduled to board 4000 may wait without moving at the corresponding location in response to the notification using the smartphone.

The person scheduled to board 4000 may receive the notification 6100 using the auditory feedback from the approaching vehicle 1000. The notification 6100 using the auditory feedback may be a voice indicating the arrival output from the vehicle 1000. Accordingly, the person scheduled to board 4000 may determine the situation in which the vehicle 1000 has approached quite close and that it is safer to stand still at the current location.

When the vehicle 1000 approaches the person scheduled to board 4000 stopped at the current location, the fragrance specified when the vehicle is called based on the notification 6200 using the olfactory and tactile feedback may be sensed. Thereafter, the person scheduled to board 4000 may move in a direction in which the fragrance concentration increases, and may identify the front side of the vehicle. Accordingly, a problem in which the person scheduled to board 4000 recognizes that the vehicle 1000 has arrived very close but is not able to recognize where the front side is may be prevented.

Figure 8:
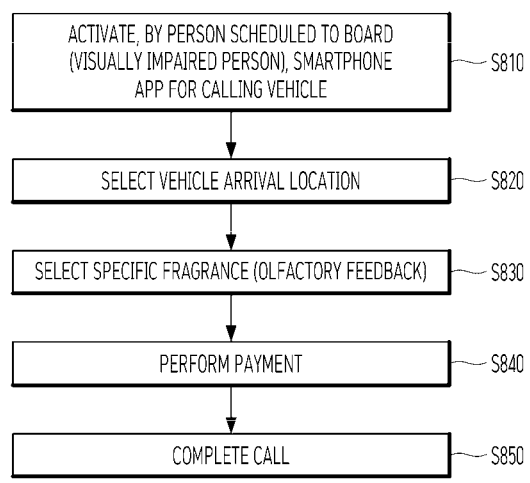
FIG. 8 is a flowchart illustrating a method for calling a vehicle to respond to the transportation vulnerable according to embodiments of the present disclosure.

FIG. 8 is a flowchart illustrating a method for calling a vehicle to respond to the transportation vulnerable according to embodiments of the present disclosure.

In the vehicle arrival notifying device 2000 to respond to the transportation vulnerable, the person scheduled to board 4000 may activate a smartphone app for calling the vehicle (S810).

After step S810, in the vehicle arrival notifying device 2000 to respond to the transportation vulnerable, the vehicle arrival location may be selected (S820).

After step S820, in the vehicle arrival notifying device 2000 to respond to the transportation vulnerable, the specific fragrance for the olfactory feedback may be selected (S830).

After step S830, in the vehicle arrival notifying device 2000 to respond to the transportation vulnerable, a payment may be performed (S840).

After step S840, in the vehicle arrival notifying device 2000 to respond to the transportation vulnerable, the call may be completed (S850).

Figure 9:
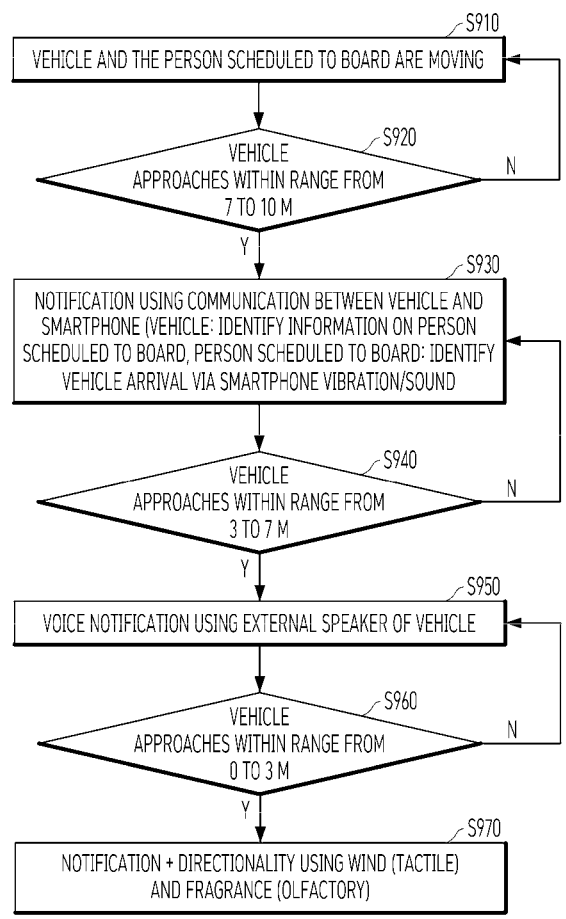
FIG. 9 is a flowchart illustrating a stepwise notification method based on an arrival area of a vehicle to respond to transportation vulnerable according to embodiments of the present disclosure.

FIG. 9 is a flowchart illustrating a stepwise notification method based on an arrival area of a vehicle to respond to transportation vulnerable according to embodiments of the present disclosure.

Referring to FIG. 9, when the vehicle 1000 and the person scheduled to board 4000 are moving (S910), the vehicle arrival notifying device 2000 to respond to the transportation vulnerable may determine whether the vehicle 1000 has approached the distance area in the range from 7 to 10 m from the person scheduled to board 4000 (S920).

After step S920, when the vehicle 1000 has approached the distance area in the range from 7 to 10 m from the person scheduled to board 4000 (Y in S920), the vehicle arrival notifying device 2000 to respond to the transportation vulnerable may provide the notification using the communication between the vehicle 1000 and the smartphone (S930). In this regard, the vehicle 1000 may identify the information on the person scheduled to board, and the person scheduled to board 4000 may identify the vehicle arrival via the smartphone vibration and sound.

After step S930, the vehicle arrival notifying device 2000 to respond to the transportation vulnerable may determine whether the vehicle 1000 has approached the distance area in the range from 3 to 7 m from the person scheduled to board 4000 (S940).

After step S940, when the vehicle 1000 has approached the distance area in the range from 3 to 7 m from the person scheduled to board 4000 (Y in S940), the vehicle arrival notifying device 2000 to respond to the transportation vulnerable may provide the voice notification using the external speaker of the vehicle. (S950).

After step S950, the vehicle arrival notifying device 2000 to respond to the transportation vulnerable may determine whether the vehicle 1000 has approached the distance area in the range from 0 to 3 m from the person scheduled to board 4000 (S960).

After step S960, when the vehicle 1000 has approached the distance area in the range from 0 to 3 m from the person scheduled to board 4000 (Y in S960), the vehicle arrival notifying device 2000 to respond to the transportation vulnerable may provide the notification and the directionality using the wind (tactile) and the fragrance (olfactory) (S970).

Figure 10:
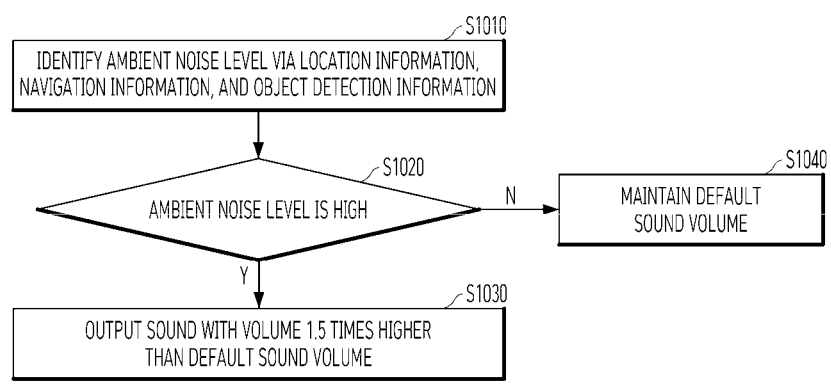
FIG. 10 is a flowchart illustrating a method for providing a sound volume differential based on an ambient noise level of a vehicle to respond to the transportation vulnerable according to embodiments of the present disclosure.

FIG. 10 is a flowchart illustrating a method for providing a sound volume differential based on an ambient noise level of a vehicle to respond to the transportation vulnerable according to embodiments of the present disclosure.

Referring to FIG. 10, the vehicle arrival notifying device 2000 to respond to the transportation vulnerability may identify the ambient noise level via the location information, the navigation information, and the object detection information (S1010).

After step S1010, the vehicle arrival notifying device 2000 to respond to the transportation vulnerable may determine whether the ambient noise level is higher than a preset value (S1020).

After step S1020, when the ambient noise level is not high (N in S1020), the vehicle arrival notifying device 2000 to respond to the transportation vulnerable may maintain the default sound volume (S1040).

After step S1020, when the ambient noise level is high (Yin S1010), the vehicle arrival notifying device 2000 to respond to the transportation vulnerable may output the sound with the volume 1.5 times higher than the default sound volume (S1030).

Figure 11:
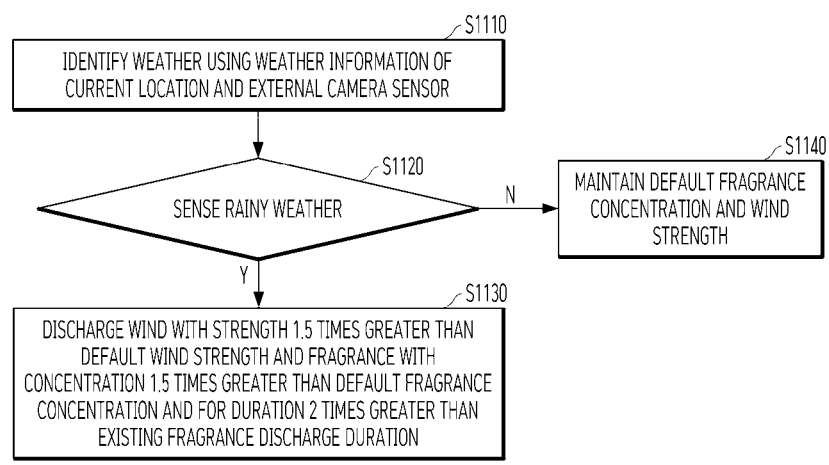
FIG. 11 is a flowchart illustrating a method for providing fragrance concentration and wind strength differentials based on weather information of a vehicle to respond to the transportation vulnerable according to embodiments of the present disclosure.

FIG. 11 is a flowchart illustrating a method for providing fragrance concentration and wind strength differentials based on weather information of a vehicle to respond to the transportation vulnerable according to embodiments of the present disclosure.

Referring to FIG. 11, the vehicle arrival notifying device 2000 to respond to the transportation vulnerability may identify weather using the weather information of the current location and the external camera sensor (S1110).

After step S1110, the vehicle arrival notifying device 2000 to respond to the transportation vulnerable may sense the rainy weather (S1120).

After step S1120, when the rainy weather is sensed (Y in S1110), the vehicle arrival notifying device 2000 to respond to the transportation vulnerable may discharge the wind with the strength 1.5 times greater than the default wind strength and the fragrance with the concentration 1.5 times greater than the default fragrance concentration and for the duration 2 times greater than the existing fragrance discharge duration (S1130).

After step S1020, when the rainy weather is not sensed (N in S1010), the vehicle arrival notifying device 2000 to respond to the transportation vulnerable may maintain the default fragrance concentration and wind strength (S1140).

That is, the technical idea of the present disclosure may be applied to an entirety of the autonomous vehicle or only to some components inside the autonomous vehicle. The scope of rights of the present disclosure should be determined based on the matters described in the claims.

As another aspect of the present disclosure, the operation of the proposal or the invention described above may also be provided as a code that may be implemented, embodied, or executed by a "computer" (a comprehensive concept including a system on chip (SoC) or a microprocessor), an application storing or containing the code, a computer-readable storage medium, a computer program product, or the like, and this also falls within the scope of the present disclosure.

The detailed descriptions of the preferred embodiments of the present disclosure disclosed as described above have been provided to enable those skilled in the art to implement and practice the present disclosure. Although the description has been made with reference to the preferred embodiments of the present disclosure, those skilled in the art will understand that the present disclosure may be variously modified and changed without departing from the scope of the present disclosure. For example, those skilled in the art may use the components described in the above-described embodiments in a scheme of combining the components with each other.

Accordingly, the present disclosure is not intended to be limited to the embodiments illustrated herein, but is to be accorded the widest scope consistent with the principles and novel features disclosed herein.

What is claimed is:

1. A method for notifying arrival of a vehicle to respond to transportation vulnerable people, the method comprising:
    determining a vehicle notification step based on a distance between the vehicle and a person scheduled to board when the vehicle approaches a location where a vehicle call is made in response to a call of the person scheduled to board who is a transportation vulnerable person, the determining of the vehicle notification step based on the distance between the vehicle and the person scheduled to board including:
        setting an area of the distance to be a vehicle notification step 1 area when the distance between the vehicle and the person scheduled to board is equal to or smaller than a first distance;
        setting an area of the distance to be a vehicle notification step 2 area when the distance between the vehicle and the person scheduled to board is equal to or smaller than a second distance; and
        setting an area of the distance to be a vehicle notification step 3 area when the distance between the vehicle and the person scheduled to board is equal to or smaller than a third distance; and
    providing a vehicle arrival notification based on the determined vehicle notification step, the providing of the vehicle arrival notification based on the determined vehicle notification step including:
        outputting a notification using olfactory and tactile feedback for notifying an arrival and a direction of the vehicle using fragrance and wind in the case of the vehicle notification step 3 area.

2. The method of claim 1, further comprising:
    receiving, by the vehicle, the vehicle call via a smartphone of the person scheduled to board;
    selecting an arrival location of the vehicle in response to the vehicle call; and
    selecting fragrance to be discharged to the person scheduled to board via the smartphone.

3. The method of claim 1, wherein the first distance is set for a case where the distance between the vehicle and the person scheduled to board is in a range from 7 m to 10 m,
    wherein the second distance is set for a case where the distance between the vehicle and the person scheduled to board is in a range from 3 m to 7 m,
    wherein the third distance is set for a case where the distance between the vehicle and the person scheduled to board is in a range from 0 m to 3 m.

4. The method of claim 1, wherein the providing of the vehicle arrival notification based on the determined vehicle notification step includes outputting a message, as the notification, indicating that the called vehicle is coming to the person scheduled to board via a notification using a smartphone in the vehicle notification step 1 area.

5. The method of claim 1, wherein the providing of the vehicle arrival notification based on the determined vehicle notification step includes outputting a notification indicating that the vehicle is about to arrive using an external speaker installed on the vehicle via a notification using auditory feedback when the person scheduled to board comes near the vehicle in the vehicle notification step 2 area.

6. The method of claim 5, wherein the providing of the vehicle arrival notification based on the determined vehicle notification step includes:
   determining an ambient noise level based on location information, navigation information, and object detection information; and
   outputting the vehicle arrival notification with a volume 1.5 times higher than a default sound volume when the ambient noise level is high.

7. The method of claim 1, wherein the providing of the vehicle arrival notification based on the determined vehicle notification step includes:
   identifying weather based on weather information of a current location and object detection information; and
   discharging the wind with a strength 1.5 times greater than a default wind strength and discharging the fragrance with a concentration 1.5 times greater than a default fragrance concentration and for a duration 2 times greater than an existing fragrance discharge duration when the identified weather is rainy weather.

8. The method of claim 1, wherein the transportation vulnerable people include at least one of visually impaired people, hearing impaired people, pregnant women, infants, children, adolescents, elderly people, buggy pushers, or wheelchair users.

9. A non-transitory computer-readable storage medium for storing at least one program code including instructions for, when executed, causing at least one processor to perform operations, wherein the operations include:
   an operation of allowing a vehicle to arrive at a location where a call is made in response to a call of a person scheduled to board who is a transportation vulnerable person;
   an operation of determining a vehicle notification step based on a distance between the vehicle and the person scheduled to board, the operation of determining including:
      setting an area of the distance to be a vehicle notification step 1 area when the distance between the vehicle and the person scheduled to board is equal to or smaller than a first distance;
      setting an area of the distance to be a vehicle notification step 2 area when the distance between the vehicle and the person scheduled to board is equal to or smaller than a second distance; and
      setting an area of the distance to be a vehicle notification step 3 area when the distance between the vehicle and the person scheduled to board is equal to or smaller than a third distance; and
   providing a vehicle arrival notification based on the determined vehicle notification step, the providing of the vehicle arrival notification based on the determined vehicle notification step including:
      outputting a notification using olfactory and tactile feedback for notifying an arrival and a direction of the vehicle using fragrance and wind in the case of the vehicle notification step 3 area.

10. A device for notifying arrival of a vehicle to respond to transportation vulnerable people, the device comprising:
   an object detector configured to recognize a person scheduled to board who is a transportation vulnerable person outside the vehicle;
   a communicator configured to be in communication with a smartphone carried by the person scheduled to board;
   an outputter including a wind discharger, a fragrance discharger, and a speaker; and
   a processor configured to:
      determine a vehicle notification step based on a distance between the vehicle and the person scheduled to board when the vehicle approaches a location where a vehicle call is made in response to a call of the person scheduled to board; and
      provide a vehicle arrival notification based on the determined vehicle notification step, wherein the processor is configured to:
         set an area of the distance to be a vehicle notification step 1 area when the distance between the vehicle and the person scheduled to board is equal to or smaller than a first distance;
         set an area of the distance to be a vehicle notification step 2 area when the distance between the vehicle and the person scheduled to board is equal to or smaller than a second distance;
         set an area of the distance to be a vehicle notification step 3 area when the distance between the vehicle and the person scheduled to board is equal to or smaller than a third distance; and
         output a notification using olfactory and tactile feedback for notifying an arrival and a direction of the vehicle using fragrance and wind in the vehicle notification step 3 area.

11. The device of claim 10, wherein the processor is configured to:
   allow the vehicle to receive the vehicle call via the smartphone of the person scheduled to board;
   select an arrival location of the vehicle in response to the vehicle call; and
   select fragrance to be discharged to the person scheduled to board via the smartphone.

12. The device of claim 3, wherein the processor is configured to:
   Set the first distance for a case where the distance between the vehicle and the person scheduled to board is in a range from 7 m to 10 m;
   set the second distance for a case where the distance between the vehicle and the person scheduled to board is in a range from 3 m to 7 m; and
   set the third distance for a case where the distance between the vehicle and the person scheduled to board is in a range from 0 m to 3 m.

13. The device of claim 3, wherein the processor is configured to output a message, as the notification, indicating that the called vehicle is coming to the person scheduled to board via a notification using the smartphone in the vehicle notification step 1 area.

14. The device of claim 3, wherein the processor is configured to output a notification indicating that the vehicle is about to arrive using an external speaker installed on the vehicle via a notification using auditory feedback when the person scheduled to board comes near the vehicle in the vehicle notification step 2 area.

15. The device of claim 14, wherein the processor is configured to:
   determine an ambient noise level based on location information, navigation information, and object detection information; and
   output the vehicle arrival notification with a volume 1.5 times higher than a default sound volume when the ambient noise level is high.

16. The device of claim 7, wherein the processor is configured to:
   identify weather based on weather information of a current location and object detection information; and
   discharge the wind with a strength 1.5 times greater than a default wind strength and discharge the fragrance with a concentration 1.5 times greater than a default fragrance concentration and for a duration 2 times greater than an existing fragrance discharge duration when the identified weather is rainy weather.

17. The device of claim 10, wherein the transportation vulnerable people include at least one of visually impaired people, hearing impaired people, pregnant women, infants, children, adolescents, elderly people, buggy pushers, and wheelchair users.

18. A vehicle comprising:
   at least one sensor configured to sense a surrounding object;
   at least one speaker configured to output auditory feedback; and
   a vehicle arrival notifying device including a processor configured to respond to a transportation vulnerable person configured to:
   determine a vehicle notification step based on a distance between the vehicle and a person scheduled to board when the vehicle approaches a location where a call is made in response to a call of the person scheduled to board who is the transportation vulnerable person; and
   provide a vehicle arrival notification based on the determined vehicle notification step, wherein the processor is configured to:
      set an area of the distance to be a vehicle notification step 1 area when the distance between the vehicle and the person scheduled to board is equal to or smaller than a first distance;
      set an area of the distance to be a vehicle notification step 2 area when the distance between the vehicle and the person scheduled to board is equal to or smaller than a second distance;
      set an area of the distance to be a vehicle notification step 3 area when the distance between the vehicle and the person scheduled to board is equal to or smaller than a third distance; and
      output a notification using olfactory and tactile feedback for notifying an arrival and a direction of the vehicle using fragrance and wind in the vehicle notification step 3 area.

* * * * *